United States Patent [19]

Netkowicz et al.

[11] 4,376,091
[45] Mar. 8, 1983

[54] MECHANICAL STRAINER UNIT

[75] Inventors: Robert J. Netkowicz; Ira H. Schnall; John B. Kraeling, Jr., all of Erie, Pa.

[73] Assignee: Zurn Industries, Inc., Erie, Pa.

[21] Appl. No.: 181,987

[22] Filed: Aug. 28, 1980

Related U.S. Application Data

[62] Division of Ser. No. 26,032, Apr. 2, 1979, abandoned.

[51] Int. Cl.³ ............................................. G21C 19/32
[52] U.S. Cl. ..................................... 376/283; 376/313
[58] Field of Search ................... 176/37, 38; 210/162, 210/488, 498; 138/42; 239/552, 555, 553.3, 575, 590.3, 590.5; 376/313, 316, 283

[56] References Cited

U.S. PATENT DOCUMENTS

| | | | |
|---|---|---|---|
| 2,118,290 | 5/1938 | Black | 138/42 |
| 2,855,106 | 10/1958 | English | 210/488 |
| 3,152,988 | 10/1964 | Gurkowski et al. | 210/498 |
| 3,259,248 | 7/1966 | Wiegand | 210/488 |
| 3,665,465 | 3/1972 | Baumann | 138/42 |
| 3,718,539 | 2/1973 | West et al. | 138/42 |
| 4,146,481 | 3/1979 | Nagatoshi et al. | 210/488 |
| 4,147,633 | 4/1979 | Kato | 210/488 |

FOREIGN PATENT DOCUMENTS

| | | | |
|---|---|---|---|
| 690980 | 4/1953 | United Kingdom | 138/42 |
| 722472 | 1/1955 | United Kingdom | 210/488 |

OTHER PUBLICATIONS

Zurn Report Spec. No., PDM-02-288 pp. 1-17.

Primary Examiner—Sal Cangialosi
Attorney, Agent, or Firm—Webb, Burden, Robinson & Webb

[57] ABSTRACT

The mechanical strainer unit is connected to a flanged conduit which originates in and extends out of a suppression chamber in a nuclear reactor. The strainer includes a plurality of centrally apertured plates positioned along a common central axis and in parallel and spaced relationship. The plates have a plurality of bores radially spaced about the central axis. Spacer means such as washers are positioned between adjacent plates to maintain the plates is spaced relationship and form communicating passages of a predetermined size to the central apertures. Connecting means such as bolts or studs extend through the aligned bores to maintain the unit in assembled relationship and secure the unit to the pipe. By employing perforated plates and blocking off certain of the communicating passages, a dual straining effect can be achieved.

3 Claims, 14 Drawing Figures

MECHANICAL STRAINER UNIT

This is a division, of application Ser. No. 26,032, filed Apr. 2, 1979, now abandoned.

BACKGROUND OF THE INVENTION

This invention relates to mechanical strainers and, more particularly, to strainer units which are of a structural nature and which connect to conduit having their intake within a suppression chamber of a nuclear reactor.

DESCRIPTION OF THE PRIOR ART

One of the major safeguard systems in a nuclear reactor is the system which removes the heat generated in the core before the temperature in the fuel exceeds the point at which the cladding will melt. Several individual systems are provided to accomplish this function because of the varying conditions that could cause a breakdown of the fuel clad integrity. Certain of these systems are tied into the suppression chamber which is generally a large covered shell or closed structure surrounding the reactor and which contains a large supply of water which is pumped through pipes for various cooling functions. In addition, the suppression chamber provides for the pressure suppression of steam which can be released into the suppression chamber pool. The suppression chamber thus offers an extremely hostile environment with environmental loading conditions caused by steam injection, fluid motion, flow drag loads, pressure loads, shock loads and vibration loads. In addition, the suppression chamber and the emergency core cooling systems associated therewith must be designed to withstand the occurrence of earthquake accelerations and the like.

It is necessary to provide for the mechanical removal of solid debris which can exist in the suppression chamber. This solid debris can take the form of pipe scale, coating flakes, products of corrosion or other foreign matter which may find its way into the suppression pool. It has been known to mechanically remove this debris by means of screening or straining whereby the debris is prevented from passing by a restrictive sizing of multiple flow passages. The screening or straining which must be installed at the entrance end of the intake conduit must withstand the loadings imposed on it by its environment.

In general, the approach has been to provide standard screens and support those screens by structural components capable of withstanding the loads. In general, heavy welded structural or slotted tubes encapsulated with and supportive of standard screening media have been employed. The standard screening media have included wire mesh screens, wound wire well screens, punched or drilled, perforated, sheet or plate. In addition, heavy tube structures with drilled or otherwise manufactured flow holes or passages have been employed as well as other structural designs utilizing cross bracing and structural supports.

For example, a structurally supported straining element has been attached to the suppression chamber wall about the intake conduit without even attaching to the conduit. T-shaped pipes having straining media at the opposing ends have been attached to the intake conduit. Likewise, a straining element has been protected within a structural member or the straining media have been attached to a right angle bend on the intake pipe.

These various designs have been unable to meet the requirements of many applications. One reason is that large, weighty and costly designs result from the high strength structural requirements. Further, large designs often are made necessary by the low amount of total flow area versus the total surface area caused by the flow interference aspects of using structural supports in combination with a screening media. Generally, the conduit attaches in some way to the suppression chamber wall through which it extends. Therefore, the application of flow drag loads and pressures on sizable exposed areas of large structural strainer designs are translated to the chamber wall itself. These high forces on the pipe and chamber walls are further intensified by earthquake accelerations. The requirements of the strainer are critical because the strainer is generally only called upon to perform when there has been an abnormal condition and at least some of the force factors which make up the hostile environment are in effect.

In addition to the high engineering and manufacturing costs associated with many of the complex structural members needed to insure reliability and integrity are the high costs of installation and maintenance due to the complexity of the design.

SUMMARY OF THE INVENTION

Our invention incorporates a new media design which is structurally self-supporting. In other words, the strainer and the structural element are one and the same. Further, our invention utilizes a straining media design which is higher in percentage of open space available than the more common approaches. This improves flow characteristics and reduces pressure loss. Further, our invention eliminates the need of costly welds and relies upon a simple bolting attachment for structural support.

Our invention is very compact and low in weight and mass so as to reduce loadings transferred to the supporting conduit and chamber wall. Since the strainer and structural member are combined into one, the magnitude of the forces transferred to the supporting conduit and chamber wall by flow drag loads and pressures is likewise small. A simplicity of design results in ease of installation and maintenance and provides for ease of cleaning since the parts are easily disassembled to permit removal of entrapped debris. Further, the design is constant for all applications and the only variable becomes the amount of open area that is needed and this can be taken care of by merely adding to the existing structure without changing the basic design. Further, if the strainer becomes loose, the bolts holding the strainers themselves carry enough strength in bending to prevent failure thereby providing a secondary safety feature.

In certain modifications of our invention, a dual straining can be achieved to eliminate excessive debris buildup at any one location.

Our invention is a strainer and structure combined into one which attaches to an intake conduit extending through a suppression chamber wall. The unit comprises a plurality of centrally apertured plates positioned along a common central axis and in parallel and spaced relationship. An end plate is positioned at a distal end of the unit in coaxial and parallel relationship with the plates. Spacer means such as washers are positioned between the adjacent plates to maintain the plates in spaced relationship and form communicating passages of a predetermined size with the central apertures. Connecting means such as studs or bolts join the strainer unit to the conduit and maintain the unit in assembled relationship with the central apertures aligned with the conduit. The plates can be perforated and certain of the communicating passages blocked off by outer and inner rings to provide a dual strainer.

DESCRIPTION OF THE PREFERRED EMBODIMENTS

There are three general classifications of radiation containment that are presently utilized in the nuclear reactor industry. These systems are identified as dry containment, pressure suppression and ice condenser. Our invention is particularly applicable to the pressure suppression method of containment and the emergency core cooling system associated therewith.

The pressure suppression type of containment is normally divided into two parts; one part contains the reactor and the related equipment and is referred to as the dry well, whereas the other part which is called the suppression chamber contains a pool of relatively cold water near atmospheric pressure. These parts are connected and when pressure builds up in the dry well, steam is forced into the suppression pool where it is condensed and dissipated.

Figure 1:
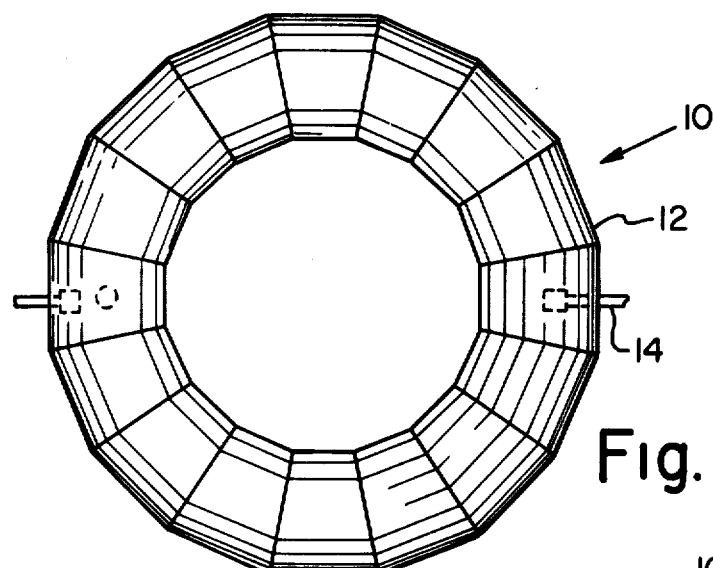
FIG. 1 is a plan view of a suppression chamber.
Figure 2:
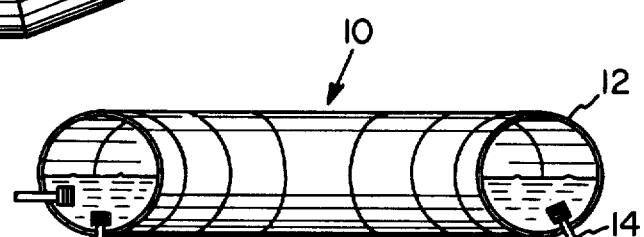
FIG. 2 is a perspective view of a portion of a torus-shaped suppression chamber showing three intake conduit.

The suppression chamber, generally designated 10, is sometimes a torus, ring-shaped vessel, FIGS. 1 and 2, constructed in segments and which surrounds the reactor (not shown). Covered annular suppression chambers are also employed. The suppression chamber 10 includes a wall 12 through which various intake pipe or conduit 14 extend. These conduits or pipes extending through the wall are often termed pentrations. This conduit 14 is normally connected to the wall 12 by various means which do not form a part of this invention. The conduit 14 is connected to various pumps and nozzles which form a part of the emergency core cooling system. The intake end of the conduit 14 is within the pool of water contained by the suppression chamber 10. The intake end of the conduit 14 requires protection via the strainer from the waste debris which exists from time to time within the suppression pool. The conduit 14 may enter the suppression chamber 10 horizontally, vertically or at some angle such as 30° from the vertical, FIG. 2.

Figure 3:
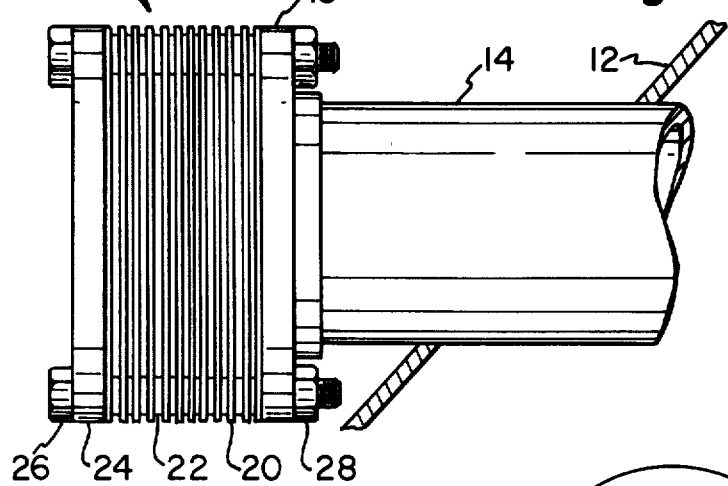
FIG. 3 is an elevation of our strainer.

The mechanical strainer, generally designated 16, attaches to a stepped flange 18 at the distal end of the conduit 14, FIG. 3. The strainer 16 is made up of a plurality of strainer plates 20, spacers in the form of washers 22, end plate 24, bolts 26 and nuts 28 which maintain the strainer 10 in assembled relationship and secure the strainer 10 to the flange 18 of conduit 14.

Figure 4:
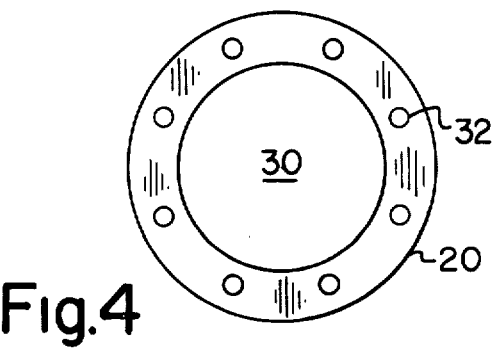
FIG. 4 is an elevation of the straining plate.

Strainer plates 20 are ring-shaped and include a central aperture 30, FIG. 4. Of course, the plates do not have to be round and any perimetric configuration can be employed provided there is an interior aperture to permit the liquid to enter the conduit. Eight bores 32 extend through the plates 20 and are radially positioned outward from the central axis thereof. The plates 20 are positioned in parallel and spaced relationship with one another with the bores 32 in alignment and the central apertures 30 being in registry with the intake of conduit 14.

Figure 6:
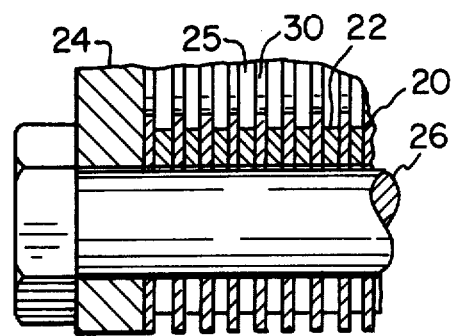
FIG. 6 is an enlarged section showing a small portion of the strainer in assembled relationship.

The plates 20 are maintained in spaced relationship to form communicating passages or slots 25 of a predetermined dimension by washers 22 which are retained in position by the bolts 26, see FIG. 6. Slots 25 communicate with the central apertures 30 which in turn exit into conduit 14. In the plate illustrated in FIG. 4, eight such washers would be used, each in registry with a bore 32 to accommodate a bolt. A typical spacing between plates is ⅛ of an inch which is defined by the thickness of the washers 22.

Figure 5:
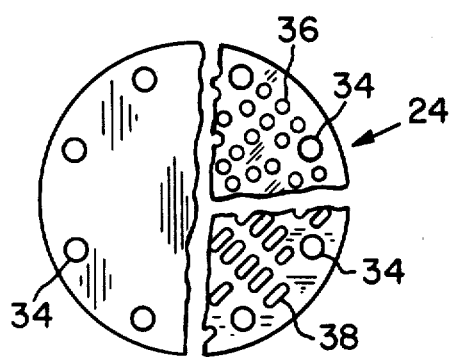
FIG. 5 is a single elevation broken apart to show three different types of end plates.

The end plate 24 is normally solid except for the end plate bores 34 which align with the strainer plate bores 32. However, the end plate 24 may include various types of openings to facilitate straining. Apertures 36 or slots 38 are examples of the types of openings that may be employed, FIG. 5.

Bolts 26 extend through the aligned strainer plate bores 32, washers 22 and end plate bores 34 as well as the flange 18 of the conduit 14. Nuts 28 are threaded on the bolts 26 and are tightened to connect the strainer 16 to the flange 18 and retain the strainer in assembled relationship.

The water from the suppression chamber pool is free to flow into the central apertures of the strainer plate 16 and into the conduit 14. The unwanted debris of a dimension greater than the space between the plates 20 is mechanically restrained from entering the conduit intake. The total open space of the strainer can be increased by merely adding more plates and spacers to the strainer.

A typical strainer for a 6 inch conduit will include 22 strainer plates having an 11 inch O.D., an 8 inch I.D. and a 1/16 inch thickness. The strainer plates are constructed of corrosion resistant material such as a Type 316 stainless steel. The 22 strainer plates require 176 washers (8 per plate) of a typical size 1-⅛ inch O.D., 13/16 inch I.D. and ⅛ inch thick. Eight ⅜ inch rods threaded at both ends are employed to hold the strainer together and to the pipe flange. Such a strainer will have a distance of 4-5/16 inches between the end plate and the pipe flange. This then represents a surface area of 149 square inches. The open area for such a strainer calculates out as 99.35 inches and the percent open area which is the open area divided by the total surface area is 66.6%. This compares favorably with existing strainers used in suppression chamber applications where efficiencies in terms of percent open area are often as low as 25%. A standard specification for strainers in this environment requires that the head loss through the strainer shall not exceed one foot with 50% of the total strainer area plugged under specified flow conditions. This is easily achieved with the subject strainer.

The subject strainer, through the bolt tension and resultant frictional forces developed between the various components, is able to withstand all the load requirements developed in the hostile environment. The bending strength of the bolts themselves provides a secondary safety feature and all the welds associated with other designs are eliminated. The strainer may also be treated such as by dip brazing in the assembled condition to form a single unit.

Figure 7:
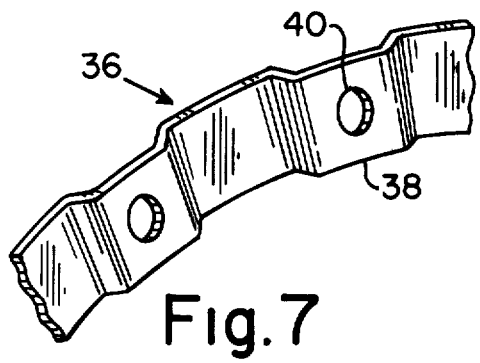
FIG. 7 is a perspective view of a portion of a modified strainer plate.
Figure 9:
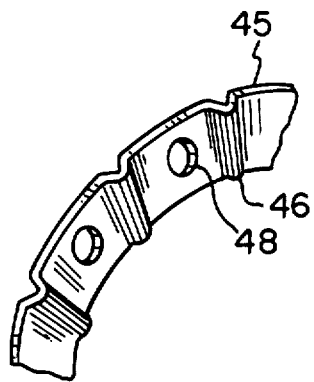
FIG. 9 is a perspective of a further modified strainer plate.
Figure 8:
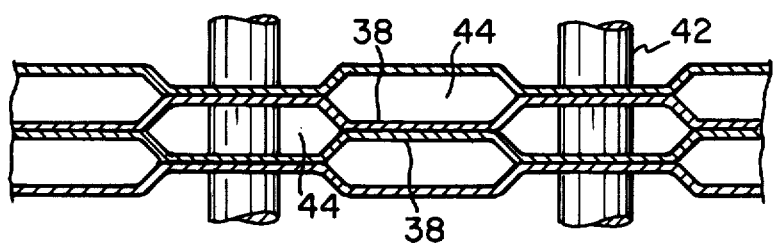
FIG. 8 is a section showing the modified strainer plate of FIG. 7 in assembled relationship.

The strainer plate and spacers may be integrally formed as illustrated in FIGS. 7-9. Strainer plate 36 is formed with offset portions 38, which offset portions define the required spacing between adjacent plates, FIG. 7. The bores 40 extend through the offset portions 38 to accommodate the studs 42. The strainer plates 36 are assembled to define slots 44, which slots have a minimum dimension defined by two offset portions 38 which matingly engage each other in the assembled condition, FIG. 8.

Figure 10:
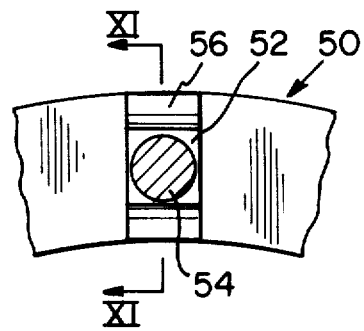
FIG. 10 is a view showing a plate constructed with bentover tabs as spacers.
Figure 11:
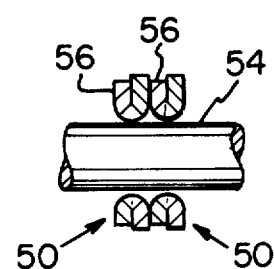
FIG. 11 is a section taken along section lines XI-XI of FIG. 10.

Likewise, the spacing can be accomplished by spacers integrally formed with the plates, but not including the bores. Strainer plate 45 includes dimples or corrugations 46 which define the desired spacing between adjacent plates, FIG. 9. The spacing can also be accomplished by folding over a portion of the plate used to form the hole, FIGS. 10 and 11.

Plate 50 is formed with a central slot (not shown) which is bent over on itself to form a square hole 52 to accommodate the bolt 54. The overlapping portion 56 then defines the spacing between the respective plates 50, FIG. 11. Several other manufacturing techniques can be employed to form a spacer integral with the plate, including using strip stock which offers a large cost advantage and high production capability over cutting discs out of plate stock. However, these various means of forming integral spacers may not be stiff enough to handle the bolt preload, in which case extra bolt preload supports must be provided, such as axial rods between the end plate and the pipe flange.

Figure 12:
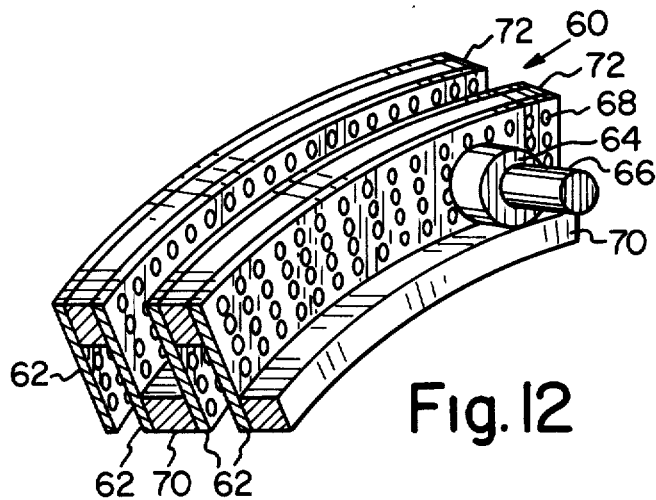
FIG. 12 is a perspective view of a portion of a dual strainer.
Figure 13:
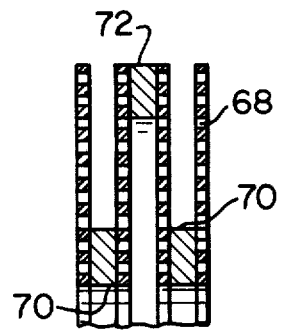
FIG. 13 is a section showing the area between bolts for the dual strainer of FIG. 12.
Figure 14:
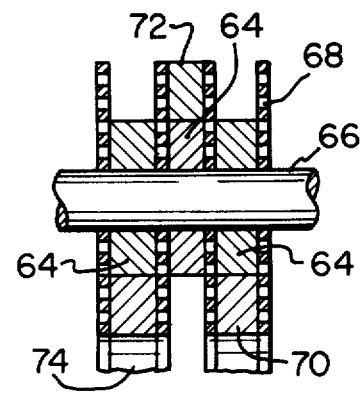
FIG. 14 is a section showing the area through a bolt for the dual strainer of FIG. 12.

A further embodiment provides for a dual strainer, FIGS. 12-14. The dual strainer, generally designated 60, also employs a plurality of strainer plates 62, spacers 64 and bolts 66 to maintain the strainer in assembled relationship as in the previous embodiments. However, each of the plates 62 contains perforations 68 so that the liquid can pass through the plates 62. Inner rings 70 and outer rings 72 are used in conjunction with the plates 62.

The inner rings 70 are positioned between two adjacent plates 62 to shut off communication with the central aperture 74. Outer rings 72 are positioned between two adjacent plates 62 to prevent any liquid from entering the space between the plates in the first instance. In other words, each space formed between the plates is alternately filled with an outer ring 72 or an inner ring 70. These rings 70, 72 are held in position by the spacers 64 which engage the rings to maintain their concentricity.

The flow of the liquid such as water from the suppression pool is initially into the space between plates having the inner ring, then through the apertures into the space between plates having the outer ring, the latter space being in communication with the central aperture of the plate and thus the conduit.

The perforated hole size represents the maximum size particle allowed to pass through the strainer. The spacing between the plates is slightly larger than the perforated holes. The spacing between plates having an outer ring can be less than the inner ring spacing. A typical strainer can have 3/32 inch diameter perforated holes, ¼ inch plate spacing for inner ring spaces and 3/16 inch plate spacing for outer ring spaces.

Any debris must first pass the ¼ inch spacing or cause blinding along the O.D. of the strainer. Those particles which pass the ¼ inch spacing are next strained through the 3/32 inch perforations which act as the second strainer. A typical dual strainer of the dimensions described above has a first stage straining capability (¼ inch retention) of 2:1 of open area between slots to open flow area of the conduit and a second stage straining capability of 55:1 of open area of perforated holes to flow area of the conduit.

It can be seen that the mechanical strainer is made up of structural elements and, therefore, is self-supporting and has the ability to withstand large and varied forces. In addition, the net open area of the strainer is substantial to increase flow characteristics and reduce pressure loss and the inlet area is no greater than the cross sectional flow area of the conduit so that no orifice effect is created. The total size of the strainer is not great and, therefore, excessive forces are not transferred to the suppression chamber wall. This is true both because of the low weight and the closeness to the wall which reduces the moment arm relative to the wall and further avoids interference with members within the suppression chamber. The strainer is easily installed and maintained and can be easily cleaned by rapid disassembly of the parts that define the flow passages. The strainer can be modified to provide a dual straining effect.

We claim:

1. In a nuclear reactor suppression chamber having at least one conduit exiting therefrom and a strainer secured to said conduit within the chamber, said improvement comprising said strainer having:

A. a plurality of centrally apertured plates positioned along a common axis and in parallel and spaced relationship, each of said plates including a plurality of perforations of a given diameter so that liquid can pass through the plates and said central apertures being in communication with the conduit;

B. spacers positioned between adjacent plates to maintain the plates in spaced relationship and form communicating passages of a predetermined size with the central apertures;

C. inner and outer rings alternately positioned in the spaces between plates, the inner rings having a diameter smaller than the outer rings and positioned adjacent the central apertures preventing entrance from the communicating passages to the central apertures and forming a first straining area limited by adjacent plates and the inner rings, the outer rings positioned adjacent the periphery of the plates preventing entrance to the communicating passages and forming a second straining area limited by adjacent plates and the outer rings; and D. connecting means joining the strainer unit to the conduit and maintaining the strainer in assembled relationship.

whereby the flow of liquid from the suppression chamber is initially into the first straining area, through the perforations of the plates into the second straining area and into the central apertures and the conduit.

2. The strainer unit of claim 1, said spacer means engaging an inner or an outer ring in the spaces between the plates to retain the rings in an aligned position within those spaces.

3. The strainer unit of claim 1, or 2 wherein the distance between the plates associated with the inner rings is slightly larger than the distance between the plates associated with the outer rings, said latter distance being greater than the perforation diameter.

* * * * *